3,274,221
REACTION PRODUCT AND PROCESS FOR THE
PRODUCTION THEREOF
Sol B. Radlove, 5220 W. Van Buren St., Chicago, Ill.
No Drawing. Filed Dec. 15, 1961, Ser. No. 160,421
10 Claims. (Cl. 260—410.9)

This application is a continuation-in-part of my application Serial No. 52,342, entitled, Chemical Process and Product Thereof, filed August 29, 1960, and now abandoned, which in turn was a continuation-in-part of my application Serial No. 854,536 entitled, Shortening Agent and Method of Making Same, filed November 23, 1959, now Patent No. 3,051,734.

This invention relates to additives for shortenings. More particularly, it relates to products which enhance the effectiveness of shortening in baking operations and to a process for the preparation of said products.

The additives of this invention are the products of reaction of water-soluble salts of monohydroxy aliphatic monocarboxylic acids and the acid halides of saturated fatty acids containing 16 to 20 carbon atoms. These additives, when incorporated in shortenings containing compounding agents having emulsifier characteristics, give the shortenings the ability to impart superior stability to batters during baking operations and an ability to produce bakery goods of improved texture and moisture retention properties.

Shortenings, as the term is commonly employed in the art, comprises oils of vegetable or animal origin, either in the hydrogenated or natural state. The shortenings may be either in the liquid or in the solid or plastic physical state.

In an effort to improve shortenings it has become the practice in recent years to admix with the basic oil component, esters such as fatty acid monoglycerides, diglycerides, polyglycerides or mixtures thereof. Although some of the esters have improved the nature of plastic shortenings, such esters have had limited utility in the normally liquid oil shortenings. The prior art also discloses that esters such as acyl lactylic acid products and salts of fatty acid esters of lactylic acids are useful in baking. These esters are prepared by conventional esterification methods or by heating the halide of a long chained fatty acid with a lactylic acid composition of the desired degree of polymerization under substantially anhydrous conditions. The latter esters are taught to be useful to improve the baking quality of wheat flours and to retard the staling of baked goods.

In order to increase the effectiveness of the various esters heretofore in use in shortenings, it has been suggested that supplemental agents be added to shortenings containing emulsifiers such as glyceryl lacto-palmitates, lactic acid tri-esters of glycerin with the hydroxy group of one lactic acid esterified with stearic acid, etc. Supplemental agents such as esters of diacetyl tartaric acid with alcohols such as stearyl alcohol and cetyl alcohol, stearyl or cetyl esters of itaconic acid, etc., are suggested in the literature as useful for the enhancement of the baking properties of shortenings, especially for "Hi-Ratio" cakes. While plastic shortenings incorporating emulsifiers have received some commercial acceptance, neither plastic nor liquid shortenings containing both an emulsifier and a supplemental agent has received commercial acceptance.

Now I have discovered that it is possible to prepare reaction products of lactic acid and similar monomeric monohydroxy aliphatic monocarboxylic acids which are useful in shortenings in combination with other compounding agents even though by themselves they have limited value in shortenings because the bakery products prepared from a shortening containing only such reaction products have a stiff, resilient physical structure. These reaction products, in conjunction with ester additives, effect a remarkable improvement in shortenings, particularly with regard to stabilization of baked goods batters before and during baking. This stabilization of the batter compositions is evidenced in cakes by high sides and a high peak center free from slumps which indicate emulsion breaks.

The reaction products of the present invention are prepared by reacting a fatty acid halide with a water-soluble monovalent cation salt of an acid selected from the group consisting of a monohydroxy aliphatic monocarboxylic acid containing 2 to 5 carbon atoms in the aliphatic hydrocarbon group and polymeric forms of said aliphatic monocarboxylic acid having 2 to 5 acyl groups. The reaction may be carried out in the presence of a solvent for fatty acids which forms a volatilizable azeotrope with water or in the absence of said solvent. Suitable solvents for this purpose are the inert hydrocarbon compounds such as hexane, benzene, toluene, xylene, and the like, which form azeotropic mixtures with water at temperatures below 150° C.

The fatty acid halides employed in accordance with this invention are prepared by conventional methods from saturated fatty acids containing from 16 to 20 carbon atoms, or fatty acid mixtures predominantly containing such fatty acids. Fatty acids of lower molecular weight such as lauric acid and myristic acid do not form reaction products possessing the ability to enhance the baking characteristics of shortenings containing ester emulsifiers. Unsaturated fatty acids having 16 to 20 carbon atoms, for example, oleic acid, likewise do not produce reaction products having value in baking.

While various halides, i.e., bromides and iodides, will enter into the instant reaction, use of fatty acid chlorides is preferred.

In order to prepare a reaction product of the above described fatty acid halides which is at least partially soluble in, for example, liquid triglyceride vegetable oil useful as a shortening, the monomeric form of the monohydroxy aliphatic monocarboxylic acid should not contain an aliphatic hydrocarbon chain exceeding 5 carbon atoms in length. Preferably a monohydroxy monocarboxylic acid having 2 to 4 carbon atoms in the aliphatic chain is utilized. Lactic acid is the preferred starting material for the preparation of the reaction products of this invention. Other monohydroxy aliphatic monocarboxylic acids such as glycollic acid and alpha hydroxy butyric acid may be used as well.

In order to prepare the particular reaction products of this invention, the reaction is conducted by heating the reactant mixture to a minimum temperature of about 100° C. At temperatures below 110° C., sodium lactate and potassium lactate and salts of similar hydroxy acids form gummy, slow reacting masses. When the reaction is carried out in a batch operation, temperatures are generally maintained in the range between about 110° C. and about 165° C. Preferably an attempt is made to exercise such control over the process that, during the exothermic portion of the reaction, temperatures are maintained in the range between about 125° C. and about 150° C. Control over the temperature of the reaction can be maintained, for example, by subjecting the reaction vessel and contents to cooling, by controlling the rate of addition of fatty acid halide, etc. If the reactants are passed through a reaction zone on a continuous basis, the reaction temperature may exceed 165° C. but preferably should not exceed between about 190° C. and 200° C.

When reacting salts of monohydroxy aliphatic monocarboxylic acids and fatty acid halides at temperatures in the range between 120° C. and 150° C., the yield of reaction product is substantially 100% of theoretical, if the reactants are present in the ratio of 1 mole of the salt of a hydroxy acid to 1 mole of fatty acid halide. Inasmuch as the reaction product is to be incorporated in foods and is subject to stringent purity regulations, I prefer to simplify the purification of the reaction product by introducing an excess of up to 10% by weight of the salt of the monohydroxy aliphatic monocarboxylic acid into the reacting mixture to insure that there will be no residue of unreacted fatty acid halide. Preferably the mole ratio of the salt of a hydroxy acid to fatty acid halide should be about 1.05 to 1.

Generally, the first step in the preparation of a reaction product of this invention is the preparation of the alkali metal salt of the hydroxy acid. Lactate products such as sodium lactate, are obtained by the reaction of lactic acid with water-soluble basic-reacting alkali metal compounds such as caustic, potassium hydroxide, sodium carbonate, sodium bicarbonate, and the like.

When the product desired is the product of reaction of a fatty acid halide with an alkali metal salt of a polymeric form of a monohydroxy monocarboxylic acid, the process of manufacture involves the steps of reacting lactic acid to form the sodium lactate salt, reacting the salt through the free hydroxyl group with additional lactic acid in amounts to form a polymeric material having between 2 and 5 acyl groups, under conditions to remove water of reaction and to form the sodium salt of the polymeric acid, i.e., lactylic lactic acid. The sodium salt of lactylic acid is then reacted with stearoyl chloride to form the stearyl ester of lactylic lactic acid.

In order to react the alkali metal salt of lactic acid or other monohydroxy monocarboxylic acid and their polymeric acid forms with fatty acid halide, it is essential that the reaction be carried out under substantially anhydrous conditions. In the presence of even relatively small amounts of water, the products of reaction of sodium lactate and fatty acid halide hydrolyze to material which is ineffective as an enhancer of the baking properties of compounded shortenings.

When the reaction is carried out under anhydrous condition, the reaction product additives formed have utility in either plastic or normally liquid shortenings in amounts of the order of about 0.3% to about 3% based upon the weight of the edible fatty acid triglyceride shortening as a whole, with amounts in the range between about 1% and about 2% being preferred.

The invention will be better understood from the following Examples which are given by way of illustration, but without any intention that the invention be limited thereto.

PREPARATION OF ADDITIVES

*Example I*

56.2 gms. (0.5 mole) of 80% lactic acid was reacted to a pH of 8.0–9.0 with sodium hydroxide solution. The sodium lactate solution was dried under vacuum (27.5″) to a pot temperature of 130° C. 100 ml. of toluene was added and an azeotropic distillation of the sodium lactate completed the dehydration. Toluene was distilled off until a pot temperature of 115° C. was reached. 151 gms. (0.5 mole) of stearoyl chloride was added slowly because of the slowness of the reaction due to the relative insolubility of the sodium lactate particularly at the beginning. The exothermic reaction was easily controlled at 130° C.

After all the stearoyl chloride was added, the temperature was maintained at 133° C.–136° C. for 1 hour. Upon completion of the heating operation, the remaining solvent was distilled off under vacuum and the product filtered clear using filter-aids to retain the colloidal sodium chloride.

The product was a solid of off-white waxy hard character which at temperatures above about 55° C. melted to a pale yellow liquid. This stearoyl lactic acid emulsifier had an acid value of 168.2 and a saponification value of 313.

*Example II*

118 gms. (1 mole plus 5% by weight excess) of 80% lactic acid was reacted to a pH of between 8.0 and 9.0 with sodium hydroxide solution. Water was removed from the sodium lactate solution by heating under 27 inch vacuum until a pot temperature of 135° C. was attained. Stearoyl chloride was added to the sodium lactate slowly and the temperature of the sodium lactate-stearoyl chloride mixture allowed to drop to 105° C.

The formation of a haze of sodium chloride evidenced the start of the exothermic reaction. Addition of stearoyl chloride was discontinued until the exothermic reaction had levelled out at approximately 150° C. At this point, cooling of the flask and its contents was carried out in conjunction with a controlled addition of stearoyl chloride adjusted to maintain the temperature at about 140° C. In toto, 302.5 gms. (1 mole) of stearoyl chloride was added to the reaction pot. After all of the stearoyl chloride was added, the temperature was maintained at approximately 135° C. for 1 hour. Upon completion of the 1 hour heating operation, the product was filtered clear using filter aids to remove the colloidal sodium chloride.

The product was a solid, off-white waxy material which at temperatures above 52° C. melted to a pale yellow liquid. The reaction product had an acid value of 161.5.

This reaction product may be dispersed in an oil shortening in a substantially stable form as by warming the shortening to between about 40° C. and about 60° C., stirring the composition until the mixture becomes homogeneous and then cooling the mixture to room temperature with agitation. Under some conditions, it may be advantageous to incorporate about 0.1% of glyceryl monostearate to stabilize emulsifier which might precipitate from solution.

A cottonseed oil shortening containing the reaction product prepared as described above was used to prepare a cake. The cake formulation is described in connection with the hereinafter set forth baking tests. The composition of the shortening is set forth in Table I and the results of the baking tests are set forth in Table II.

*Example III*

39.3 gms. (0.33 mole plus 5% excess) of 80% lactic acid was reacted to a pH of 8.0–9.0 with sodium hydroxide solution.

Without drying the solution, 37.5 gms. (0.33 mole) of 80% lactic acid was added with agitation. The solution was dried under vacuum to a pot temperature of 130° C. Vacuum was released and nitrogen passed through the reaction vessel and the heating continued for about 1 hour when the pot temperature had risen to approximately 160° C.

The pot temperature was allowed to cool to 125° C. and 100.3 gms. (0.33 mole) of stearoyl chloride was added while maintaining the pot temperature in the range of 130° C. to 145° C.

After 1 hour at 130° to 145° C., the sodium chloride was removed by filtration using filter and the product was a solid of off-white waxy hard character.

BAKING TESTS

Shortenings were evaluated by baking tests utilizing the following cake formula, which is widely used in industry as a means of evaluating shortenings.

| | Ozs. |
|---|---|
| Cake flour | 7¾ |
| Granulated sugar | 10¼ |
| Baking powder | ½ |
| Salt | ¼ |

To the above ingredients was added 100 grams of the shortening to be tested (compositions given in Table I below) and 5 ozs. of liquid skim milk, the mixture being beaten for one minute with an electric mixer.

tained at this level for about 1 hour. The ester reaction product is a clear yellow liquid which at temperatures below 120° C. solidifies to a soft white solid having an acid value of the order of 25.6.

TABLE I.—COMPOSITION OF SHORTENINGS

| Designation | Shortening | Percent | Compounding Agent | Percent | Additive | Percent |
|---|---|---|---|---|---|---|
| A | Plastic Shortening (Vream-Swift & Co., no added emulsifier). | 100 | | | | |
| B | Cottonseed Oil | 100 | | | | |
| C | ----do---- | 96 | GLP | 4 | | |
| D | ----do---- | 96 | | | Ester of Example I | 4 |
| E | Plastic Shortening | 97 | | | Ester of Example II | 3 |
| F | Cottonseed Oil | 96 | GLP | 3 | ----do---- | 1 |
| G | ----do---- | 96 | Citrate Ester | 2 | Ester of Example I | 2 |
| H | Plastic Shortening | 96 | ----do---- | 2 | ----do---- | 2 |
| I | Cottonseed Oil | 95 | {GLP / Citrate Ester} | {3 / 1} | }Ester of Example II | 1 |
| J | Commercial Plastic Shortening | 100 | | | | |
| K | Cottonseed Oil | 96 | Citrate Ester | 2 | Ester of Example III | 2 |
| L | Plastic Shortening | 96 | ----do---- | 2 | ----do---- | 2 |

To this shortening-containing mixture was added 3 ozs. of liquid skim milk, 4 ozs. of egg whites, 5 ml. of vanilla extract. The mixture was then beaten for 3 minutes with an electric mixer. The beaten mixture produces a batter having the specific gravity given in Table II below.

15 ozs. of the batter was placed in an 8 inch cake pan and the batter was then baked at 190.5° C. (375° F.) for 26 minutes.

In Table I below, where shortening compositions are set forth, glyceryl lacto-palmitate is referred to as GLP and the product of reaction of citric acid with a fatty acid partial ester of glycerol and/or stearyl alcohol is referred to as citrate ester.

The citrate esters, to illustrate the method of manufacture of one compounding agent may be prepared by reacting equimolar proportions of glyceryl monostearate and a mixture of fatty acid monoglycerides and fatty acid diglycerides in which the monoglycerides comprise 65% of the total weight, diglycerides constitute 32% of the total weight, the remainder being triglycerides. The mixture is isolated from contact with air while being heated to about 100° C. with constant agitation. To these glyceride esters is added anhydrous citric acid in the proportion of one mole of citric acid to 3 moles of glyceride esters. Citric acid containing mixture is then heated to between 151° C. (303.8° F.) and 155° C. (311° F.) for one hour. The temperature of the resulting reacted mixture is then raised to between about 160° C. (320° F.) and 163° C. (325.4° F.) and main- In Table II, there is set forth the results of baking tests made with the compositions set forth above in Table I and utilizing the cake formula and baking technique given above.

TABLE II.—EVALUATION OF BATTERS AND CAKES

| Designation | Specific Gravity of Batter | Average Vol. of Cake (ml.) | Cake Character | |
|---|---|---|---|---|
| | | | Texture | Form |
| A | 0.90 | 1,000 | Coarse, Irregular | Low Sides, Flat Top. |
| B | 1.1 | 980 | Coarse and Heavy | Do. |
| C | 0.94 | 1,105 | Center Coarse and Heavy | Center Fell. |
| D | 0.95 | 1,130 | Resilient, Firm and Tough | Slight Peak. |
| E | 0.93 | 1,130 | Resilient, Firm and Tough, Even. | Slight Peak, Small Sides. |
| F | 0.84 | 1,270 | Tunneling Fair | High Sides, Good Peak, Color Brown, Faint Ring. |
| G | 0.90 | 1,220 | Very Good, Slightly Open | Sides High, Center Full. |
| H | 0.88 | 1,265 | Good, Slightly Open | Even Color, Sides High, Center Full. |
| I | 0.92 | 1,210 | Excellent, Slightly Open | High Sides, Full Top, Even Color. |
| J | 0.93 | 1,095 | Good | Good Peak. |
| K | 1.00 | 1,180 | Slightly Coarse and Irregular | High Sides, Good Peak, Pale Top. |
| L | 0.94 | 1,210 | ----do---- | Medium Sides, High Peak, Brown Top. |

It will be seen from Table II that the stearoyl-lactate reaction product only functions to improve the volume, texture and appearance of cakes when used in conjunction with compounding agents. Comparison of cakes prepared from shortenings B and D with any of the shortenings F, G or H and J shows that shortenings containing a compounding agent or a mixture of compounding agents and a stearoyl-lactate additive made in accordance with the present invention, produce cakes of volume and cake character superior to those produced from commercially available shortenings or commercially available shortenings containing only the additives of this invention. Comparison of cakes prepared from shortening I which has a plastic shortening base with shortening F and G which have an oil shortening base shows that the additives of this invention effectively improve the cake products produced by both forms of shortenings.

The primary advantages of the products of this invention are the singular nature of the products, i.e., the relative freedom from byproducts and extraneous polymeric products, and the uniformity and reproducibility of the baking results obtainable with each product.

I claim:
1. The method of producing an additive having utility in shortenings which comprises admixing inert hydro- carbon solvent which forms azeotropic mixtures with water at temperatures below 150° C. with an aqueous solution of alkali metal salt of monomeric monohydroxy aliphatic monocarboxylic acid containing 2 to 5 carbon atoms in the aliphatic hydrocarbon group, heating the admixture to remove solvent-water azeotropes until the mixture is substantially dehydrated, mixing substantially dehydrated mixture under substantially anhydrous conditions with a halide of a saturated fatty acid containing 16 to 20 carbon atoms in substantially equimolar proportions, heating such mixture to a temperature in the range between about 100° C. and 200° C. whereby a product with acid number in the range between 161.5 and 168.2 is obtained, removing any solvent remaining in the reaction mixture after completion of reaction heating, and separating the substantially solvent free reaction mixture from alkali metal halide.

2. The method of producing a reaction product having utility in shortenings which comprises heating a substantially anhydrous sodium salt of monomeric lactic acid to a minimum temperature of about 100° C., adding stearoyl chloride in an amount producing a molar ratio of salt to fatty acid halide in the range between about 1:1 and about 1.1:1 and maintaining the mixture under substantially anhydrous conditions and at a temperature in the range of about 150° C. whereby a product with acid number in the range between 161.5 and 168.2 is obtained, removing any solvent remaining in the reaction mixture after completion of reaction heating, and filtering the reaction product.

3. The method of producing a reaction product having utility in shortenings which comprises reacting monomeric lactic acid with aqueous sodium hydroxide solution, heating the aqueous solution of sodium lactate under vacuum until a pot temperature of about 130° C. is attained, adding toluene to the sodium lactate solution, heating the mixture to distill toluene-water azeotrope until the boiling point of the mixture rises to about 115° C., adding stearoyl chloride in an amount producing a molar ratio of salt to stearoyl chloride in the range between about 1:1 and about 1.1:1 to the distilled mixture while maintaining substantially anhydrous conditions and the reaction temperature at approximately 130° C. during the period of exothermic reaction, heating the reaction mixture to a temperature between 133° C. and 136° C. for 1 hour after completion of the exothermic reaction whereby a product with acid number in the range between 161.5 and 168.2 is obtained, removing toluene remaining in the reacted mixture by distillation under vacuum, filtering the reacted mixture while hot to remove sodium chloride and cooling the mixture to a waxy solid.

4. The method of producing a reaction product having utility in shortenings which comprises heating substantially anhydrous sodium salt of monomeric lactic acid prepared from solvent solution to a minimum temperature of about 100° C., adding stearoyl chloride in an amount producing a molar ratio of salt to stearoyl chloride in the range between about 1:1 and about 1.1:1 and maintaining the mixture under substantially anhydrous conditions and at a temperature in the range between 100° C. and 200° C. whereby a product with acid number in the range between 161.5 and 168.2 is obtained, removing any solvent remaining in the reaction mixture after completion of reaction heating, and filtering the solvent-free reaction mixture to remove alkali metal halide.

5. The method of producing an additive having utility in shortenings which comprises heating under substantially anhydrous conditions an alkali metal salt of monomeric monohydroxy aliphatic monocarboxylic acid containing 2 to 5 carbon atoms in the aliphatic hydrocarbon group to a minimum temperature of about 110° C., adding a halide of a saturated fatty acid containing 16 to 20 carbon atoms in an amount producing a molar ratio of salt to fatty acid halide in the range between about 1:1 and about 1.1:1 and maintaining the mixture at a temperature in the range between 100° C. and 200° C. whereby a product with acid number in the range between 161.5 and 168.2 is obtained.

6. The method of producing an additive having utility in shortenings which comprises removing water from an aqueous solution of a water-soluble alkali metal salt of monomeric monohydroxy aliphatic monocarboxylic acid containing 2 to 5 carbon atoms in the aliphatic hydrocarbon group to form a substantially anhydrous salt, adding a halide of a saturated fatty acid containing 16 to 20 carbon atoms in an amount producing a molar ratio of salt to fatty acid halide in the range between about 1:1 and about 1.1:1 and maintaining the mixture under anhydrous conditions and at a temperature in the range between 100° C. and 200° C. whereby a product with acid number in the range between 161.5 and 168.2 is obtained.

7. The method of producing an additive having utility in shortenings which comprises heating under substantially anhydrous conditions a mixture of an alkali metal salt of a monomeric monohydroxy aliphatic monocarboxylic acid containing 2 to 5 carbon atoms in the aliphatic hydrocarbon group and a halide of a saturated fatty acid containing 16 to 20 carbon atoms in an amount producing a molar ratio of salt to fatty acid halide in the range between about 1:1 and about 1.1:1 to a temperature in the range between about 100° C. and 200° C. whereby a product with acid number in the range between 161.5 and 168.2 is obtained and separating the reaction product from alkali metal halide salt.

8. The method of producing an additive having utility in shortenings which comprises heating under substantially anhydrous conditions a mixture of an alkali metal salt of a monomeric monohydroxy aliphatic monocarboxylic acid containing 2 to 5 carbon atoms in the aliphatic hydrocarbon group and a halide of a saturated fatty acid containing 16 to 20 carbon atoms to a temperature in the range between about 100° C. and 200° C. whereby a product with acid number in the range between 161.5 and 168.2 is obtained, said mixture containing up to 10% by weight excess of alkali metal salt over the amount required to have a molar ratio of reactants of 1:1, and filtering the reaction product free of alkali metal halide salt.

9. The method of producing an additive having utility in shortenings which comprises admixing inert hydrocarbon solvent which forms an azeotropic mixture with water at temperatures below about 150° C. with an aqueous solution of alkali metal salt of monomeric monohydroxy aliphatic monocarboxylic acid containing 2 to 5 carbon atoms in the aliphatic hydrocarbon group, heating the mixture to remove solvent-water azeotropes until the mixture is substantially dehydrated, mixing dehydrated mixture under anhydrous conditions with a halide of a saturated fatty acid containing 16 to 20 carbon atoms in an amount producing a molar ratio of salt to fatty acid halide in the range between about 1:1 and about 1.1:1 and maintaining the mixture at a temperature in the range between 100° C. and 200° C. whereby a product with acid number in the range between 161.5 and 168.2 is obtained.

10. The method of producing a reaction product having utility in shortenings which comprises reacting lactic acid with sodium hydroxide to form the sodium salt of monomeric lactic acid, heating the aqueous solution of sodium lactate under vacuum to drive off substantially all of the water and to form an anhydrous sodium lactate concentrate, adding water-free stearoyl chloride in an amount producing a molar ratio of salt to fatty acid halide in the range between about 1:1 and about 1.1:1 to said concentrate while maintaining the temperature of the mixture in the range between 100° C. and 150° C., heating the mixture at approximately 135° C. for 1 hour after all stearoyl chloride is added whereby a product with acid number in the range between 161.5 and 168.2 is obtained, filtering the reacted mixture while hot to remove sodium chloride and cooling the reacted mixture to a waxy solid.

References Cited by the Examiner

UNITED STATES PATENTS

| | | | |
|---|---|---|---|
| 1,691,647 | 11/1928 | Doerinckel et al. | 260—548 |
| 2,025,984 | 12/1935 | Harris | 260—106 |
| 2,690,971 | 10/1954 | Iveson et al. | 99—118 |
| 2,733,252 | 1/1956 | Thompson et al. | 260—410.9 |
| 2,789,992 | 4/1957 | Thompson et al. | 260—410.9 |
| 2,813,032 | 11/1957 | Hall | 99—163 |
| 2,864,705 | 12/1958 | Schulman | 99—118 |
| 2,973,270 | 2/1961 | Thompson et al. | 99—123 |

OTHER REFERENCES

"Concise Chemical and Technical Dictionary," Chemical Publ. Co., Brooklyn, N.Y., 1947, page 482.

A. LOUIS MONACELL, *Primary Examiner.*

TOBIAS E. LEVOW, *Examiner.*

M. W. GREENSTEIN, *Assistant Examiner.*